(12) United States Patent
Hironishi

(10) Patent No.: US 7,212,334 B2
(45) Date of Patent: May 1, 2007

(54) OPTICAL SIGNAL-TO-NOISE RATIO IMPROVING DEVICE

(75) Inventor: Kazuo Hironishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/508,950

(22) Filed: Aug. 24, 2006

(65) Prior Publication Data

US 2006/0285200 A1    Dec. 21, 2006

Related U.S. Application Data

(60) Division of application No. 11/136,412, filed on May 25, 2005, now Pat. No. 7,123,403, which is a continuation of application No. PCT/JP03/04775, filed on Apr. 15, 2003.

(51) Int. Cl.
*H01S 3/00* (2006.01)
*H04B 10/00* (2006.01)

(52) U.S. Cl. .................. 359/337; 359/349; 398/175

(58) Field of Classification Search ............. 398/178, 398/175; 359/337, 349
See application file for complete search history.

(56) References Cited

U.S. PATENT DOCUMENTS

| 6,151,428 | A | 11/2000 | Vahala et al. | |
|---|---|---|---|---|
| 6,195,188 | B1 | 2/2001 | Sekiguchi | |
| 7,010,235 | B2 * | 3/2006 | Ueno | ............... 398/178 |
| 2001/0021046 | A1 | 9/2001 | Otani et al. | |

FOREIGN PATENT DOCUMENTS

| JP | 61-9606 | 1/1986 |
|---|---|---|
| JP | 64-26826 | 1/1989 |
| JP | 9-98136 | 4/1997 |
| JP | 10-333199 | 12/1998 |
| JP | 2001-231058 | 8/2001 |
| JP | 2002-122896 | 4/2002 |
| JP | 2002-244171 | 8/2002 |

OTHER PUBLICATIONS

B. K. Nayari, et al., "Concatenated all-optical loop mirror switches", Journal of Modern Optics, 1993, vol. 40, No. 12, pp. 2327-2332.
K.E. Stubkjaer, et al., "Wavelength Conversion Devices and Techniques", Proceedings of $22^{ND}$ European Conference on Optical Communication—ECOC'96, ThB.2.1, 1996.

* cited by examiner

*Primary Examiner*—Mark Hellner
(74) *Attorney, Agent, or Firm*—Staas & Halsey LLP

(57) ABSTRACT

An optical signal processing method is disclosed that enables improvements of a signal to noise ratio of an optical signal and reduction of size and power of an optical signal processing device. The optical signal processing method includes steps of dividing an input optical signal into a first polarization optical component and a second polarization optical component orthogonal to the first polarization optical component; supplying the first polarization optical component to a first gain device whose gain saturates at a first value; supplying the second polarization optical component to a second gain device whose gain saturates at a second value less than the first value; combining output light from the first gain device and output light from the second gain device; and outputting the combined optical signal through a polarization element.

5 Claims, 10 Drawing Sheets

INPUT Pin (IN REAL NUMBER)

OPTICAL SIGNAL-TO-NOISE RATIO IMPROVING DEVICE

CROSS-REFERENCE TO RELATED APPLICATION

This application is a divisional of application Ser. No. 11/136,412, filed May 25, 2005 now U.S. Pat. No. 7,123,403. Application Ser. No. 11/136,412, filed May 25, 2005 is a U.S. continuation application filed under 35 USC 111(a) claiming benefit under 35 USC 120 and 365(c) of PCT application JP03/04775, filed on Apr. 15, 2003. The application is hereby incorporated herein by reference.

TECHNICAL FIELD

The present invention generally relates to an optical signal processing device and a method thereof, and particularly, to an optical signal processing device and a method thereof used in optical communication or optical measurements for improving a signal to noise (S/N) ratio of an optical signal.

TECHNICAL BACKGROUND

FIG. 1 and FIG. 2 illustrate examples of optical signal processing devices used in optical communication or optical measurements for improving a signal to noise (S/N) ratio of an optical signal itself, as disclosed respectively by B. K. Nayar, et al., "Concatenated all-optical loop mirror switches", Journal of Modern Optics, Vol. 40, No. 12, pp. 2327–2332, 1993, and by K. E. Stubkjaer, et al., "Wavelength conversion devices and techniques" Proceedings of 22nd European Conference on Optical Communication ECOC'96, ThB. 2. 1, 1996.

FIG. 1 is a diagram illustrating a device using a non-linear loop mirror (NOLM).

FIG. 2 is a diagram illustrating a device using a wavelength converter.

In FIG. 1, an input optical signal having a wavelength of λs passes through an optical coupler 1 and is input to a non-linear optical fiber 2. On the other hand, a continuum light beam having a wavelength of λprb is output from a laser 3. This continuum light beam passes through a polarization controller 4, and is input to an optical coupler 5, in which the continuum light beam is divided into two probe light beams. One of the two probe light beams passes through the optical coupler 1 and is input to the non-linear optical fiber 2, and the other probe light beam passes through a polarization controller 6 and is input to the non-linear optical fiber 2 from an opposite direction. In the non-linear optical fiber 2, by cross-phase modulation, a phase-modulated light beam is generated which has the wavelength of λprb but includes a signal component of the wavelength of λs. This light beam passes through the polarization controller 6 and interferes with a light beam in an opposite direction in the optical coupler 5, thereby, generating and outputting an intensity-modulated signal of the wavelength λprb with reduced noise.

In FIG. 2, a continuum light beam having a wavelength of λ2 is output from a laser 10, passes through a waveguide 11, and is input to an optical coupler 12. The input light beam is divided into two continuum light beams, and the two continuum light beams are respectively input to semiconductor optical amplifiers 13, 14. On the other hand, an input optical signal having a wavelength of λ1 is supplied from a waveguide 18. This input signal passes through an optical coupler 15, and is input to the semiconductor optical amplifier 13 in a direction opposite to the direction of the continuum light beam output from the semiconductor optical amplifier 13.

The optical signals respectively output from the semiconductor optical amplifiers 13 and 14 are mixed in the optical coupler 16, and a light beam is generated and output through a waveguide 17, which has a wavelength of λ2 and reduced noise due to interference and signal transcription caused by cross-phase modulation.

In addition, a method for improving an extinction ratio of an optical fiber is disclosed in Japanese Laid Open Patent Application No. 61-9606.

However, in the device using a non-linear loop mirror (NOLM) as illustrated in FIG. 1, because the non-linear optical fiber 2 is used, it is difficult to make the device compact. In addition, because it is required to set the power of the input light beams to be a sufficiently large value, it is difficult to reduce the power of the input light beams.

Further, in the device using a wavelength converter as illustrated in FIG. 2, when the frequency of the input signal is higher than 10 GHz, input/output performance of the device degrades, and it becomes difficult to output signals having the same wavelength obtained by converting the input signals, hence, such a device is not suitable for use of improving the S/N ratio of an optical signal.

DISCLOSURE OF THE INVENTION

A general object of the present invention is to provide an optical signal processing method and an optical signal processing device able to be made compact, reduce power consumption and able to improve a signal to noise ratio of an optical signal.

According to a first aspect of the present invention, there is provided an optical signal processing method including steps of dividing an input optical signal into a first polarization optical component and a second polarization optical component orthogonal to the first polarization optical component; supplying the first polarization optical component to a first gain device, in said first gain device, a gain of power of an input optical signal saturating at a first value; supplying the second polarization optical component to a second gain device, in said second gain device, a gain of power of an input optical signal saturating at a second value less than the first value; combining output light from the first gain device and output light from the second gain device; and outputting the combined optical signal through a polarization element.

According to a second aspect of the present invention, there is provided an optical signal processing device comprising one or more optical signal processing sections, wherein the optical signal processing section includes a divider that divides an input optical signal into a first polarization optical component and a second polarization optical component orthogonal to the first polarization optical component; a first gain device supplied with the first polarization optical component, in said first gain device, a gain of power of an input optical signal saturating at a first value; a second gain device supplied with the second polarization optical component, in said second gain device, a gain of power of an input optical signal saturating at a second value less than the first value; a combination unit that combines output light from the first gain device and output light from the second gain device; and a polarization unit supplied with an optical signal output from the polarized-light combination unit.

As an embodiment, the optical signal processing device further comprises a dividing device that divides an input optical signal into a first polarization optical component and a second polarization optical component orthogonal to the first polarization optical component, the first polarization optical component being supplied to one of the optical signal processing sections at a predetermined polarization angle, the second polarization optical component being supplied to another one of the optical signal processing sections at a predetermined polarization angle; and a combination unit that combines output light from the one optical signal processing section and output light from the another one optical signal processing section.

As an embodiment, the optical signal processing device further includes an optical amplification unit that amplifies an input optical signal, an optical signal output from the optical amplification unit being supplied to one of the optical signal processing sections; an optical detection unit that detects power of the input optical signal; and a gain control unit that controls a gain of the optical amplification unit according to the power of the input optical signal detected by the optical detection unit.

As an embodiment, the optical signal processing device further includes an optical amplification unit that amplifies an input optical signal, an optical signal output from the optical amplification unit being supplied to the one optical signal processing section and the other one optical signal processing section; an optical detection unit that detects power of the input optical signal; and a gain control unit that controls a gain of the optical amplification unit according to the power of the input optical signal detected by the optical detection unit.

As an embodiment, the optical signal processing device further includes a bias light source that outputs bias light to be combined with the optical signal output from the optical amplification unit, said combined light being supplied to the optical signal processing unit.

As an embodiment, the optical signal processing device further comprises a driving current control unit that calculates gains of a plurality of gain devices in the optical signal processing unit from a power level of the optical signal output from the optical amplification unit and respective power levels of optical signals output from the gain devices, and controls driving currents of the respective gain devices so that the gains of the gain devices become predetermined values.

As an embodiment, the optical signal processing device further comprises a continuum light generating unit that outputs a continuum laser beam; and a wavelength conversion unit that is supplied with an input optical signal and the continuum laser beam, and generates an output optical signal having a predetermined polarization state and including an intensity-modulated signal of the input optical signal at the wavelength of the continuum laser beam, an optical signal output from the wavelength conversion unit being supplied to one of the optical signal processing sections.

As an embodiment, the optical signal processing device further comprises a continuum light generating unit that outputs a continuum laser beam; and a wavelength conversion unit that is supplied with an input optical signal and the continuum laser beam, and generates an output optical signal having a predetermined polarization state and including an intensity-modulated signal of the input optical signal at the wavelength of the continuum laser beam, an optical signal output from the wavelength conversion unit being supplied to the one optical signal processing section and the another one optical signal processing section.

As an embodiment, the optical signal processing device further comprises an optical clock regeneration unit that regenerates an optical clock from an input optical signal; and a wavelength conversion unit that is supplied with an input optical signal and the regenerated optical clock, and generates an output optical signal having a predetermined polarization state and including an intensity-modulated signal of the input optical signal at the wavelength of the regenerated optical clock, an optical signal output from the wavelength conversion unit being supplied to one of the optical signal processing sections.

As an embodiment, the optical signal processing device further comprises an optical clock regeneration unit that regengerates an optical clock from an input optical signal; and a wavelength conversion unit that is supplied with an input optical signal and the regenerated optical clock, and generates an output optical signal having a predetermined polarization state and including an intensity-modulated signal of the input optical signal at the wavelength of the regenerated optical clock, an optical signal output from the wavelength conversion unit being supplied to the one optical signal processing section and the other one optical signal processing section.

As an embodiment, in the optical signal processing device, each of the first gain device and the second gain device is a semiconductor optical amplifier.

As an embodiment, in the optical signal processing device, each of the first gain device and the second gain device is a distributed feedback laser diode.

As an embodiment, in the optical signal processing device, each of the first gain device and the second gain device is a Raman amplifier.

According to the present invention, it is possible to provide an optical signal processing method and an optical signal processing device able to improve a signal to noise ratio of an optical signal, and the optical signal processing device can be made compact and has low power consumption.

BEST MODE FOR CARRYING OUT THE INVENTION

Below, embodiments of the present invention are explained with reference to the accompanying drawings.

First Embodiment

Figure 1:
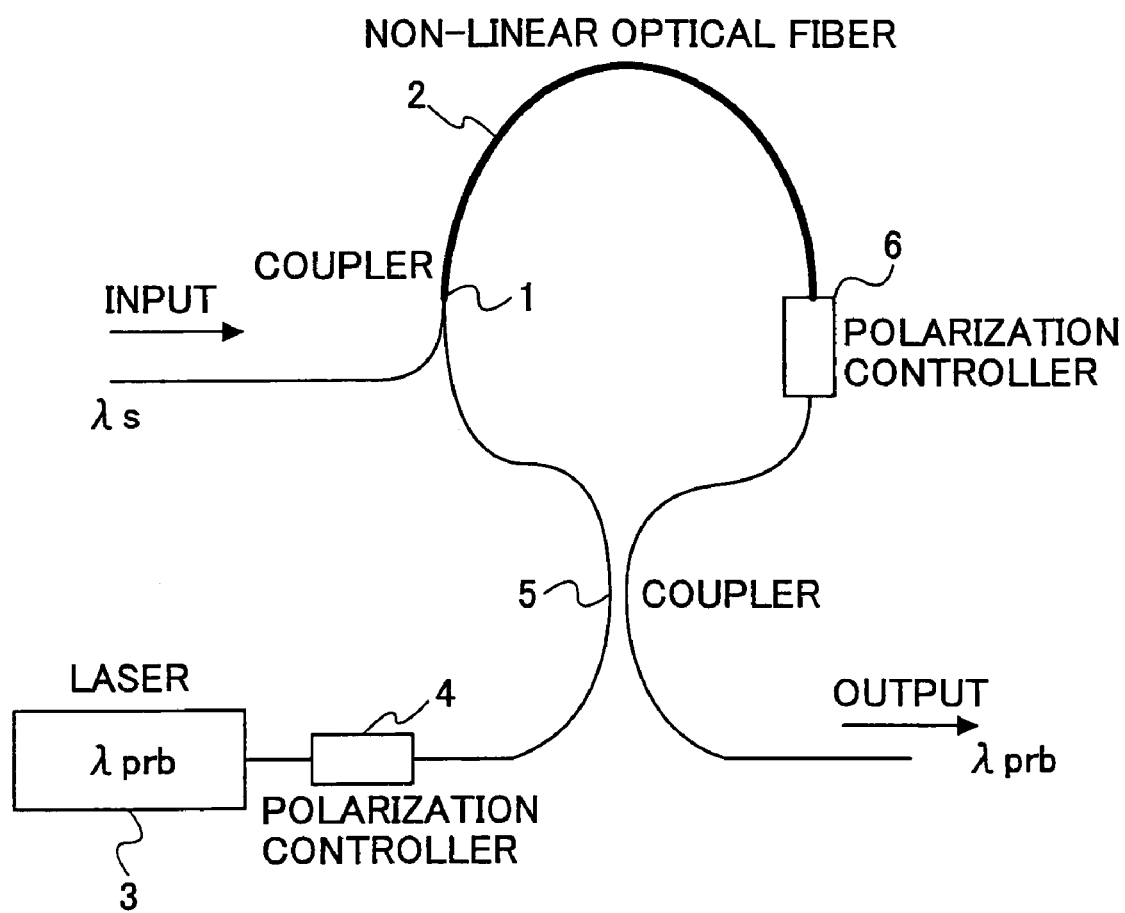
FIG. 1 is a diagram illustrating a device using a non-linear loop mirror (NOLM)
Figure 2:
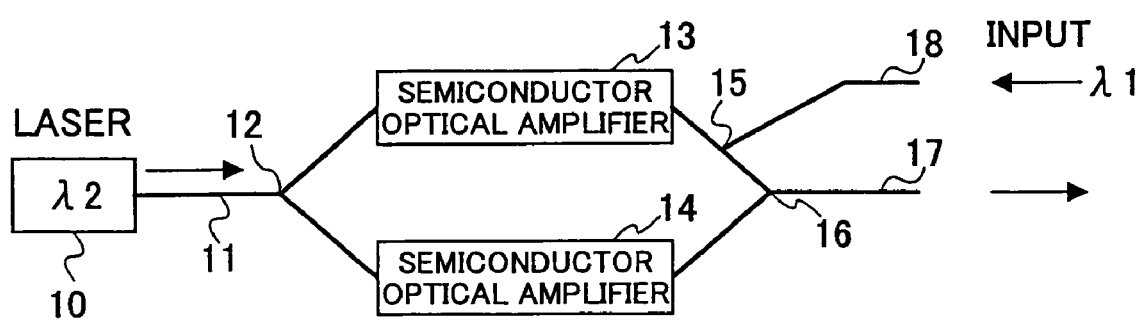
FIG. 2 is a diagram illustrating a device using a wavelength converter.
Figure 3:
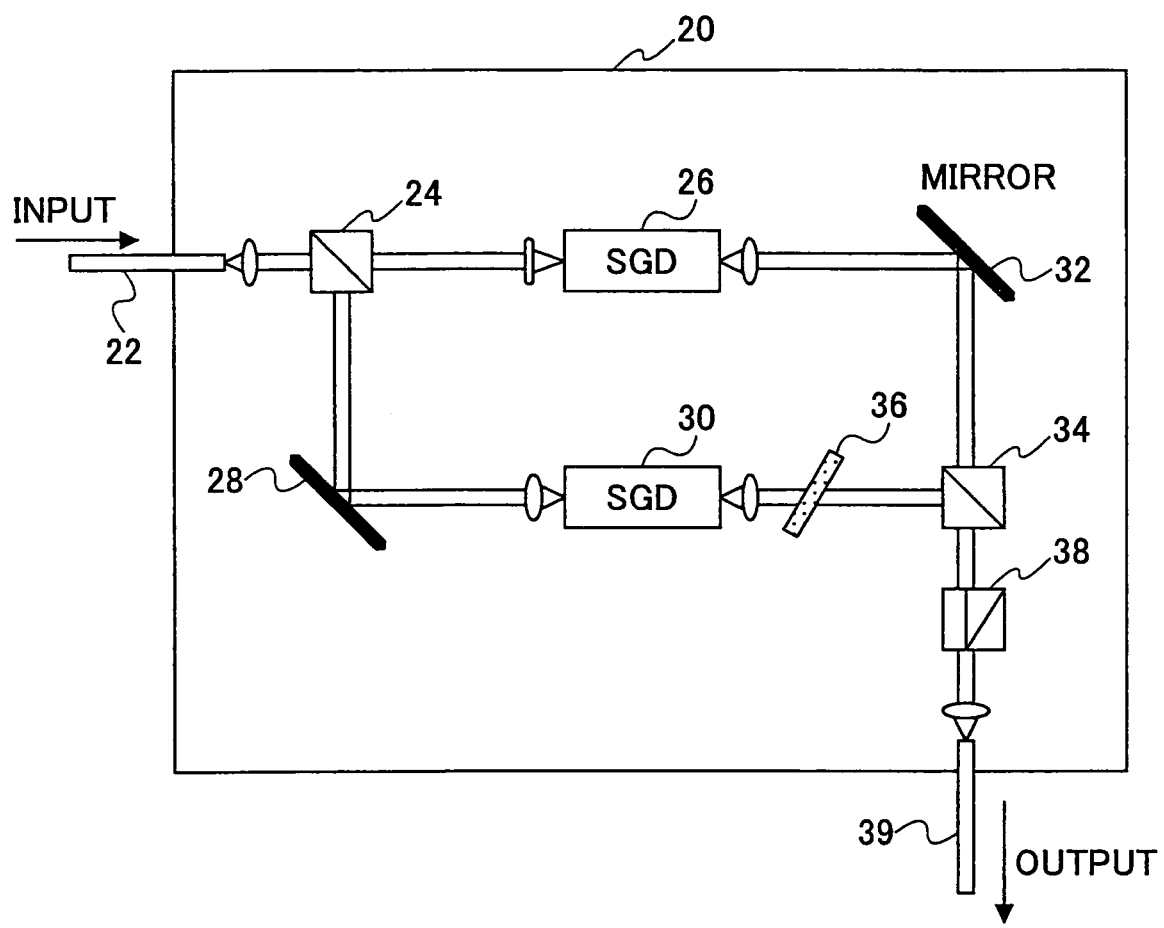
FIG. 3 is a block diagram illustrating an optical signal processing device 20 according to a first embodiment of the present invention.

FIG. 3 is a block diagram illustrating an optical signal processing device 20 according to a first embodiment of the present invention.

As illustrated in FIG. 3, in the optical signal processing device 20, a linearly-polarized optical signal is output from an optical fiber 22, and is input to a polarization element 24. The polarization element 24 divides the input optical signal into two components having polarization directions perpendicular to each other, for example, one is along the X axis and the other is along the Y axis (not illustrated). The X component is input to a saturable gain device (SGD) 26, and the Y component is reflected on a reflecting mirror 28 and is then input to an SGD 30.

Figure 4A:
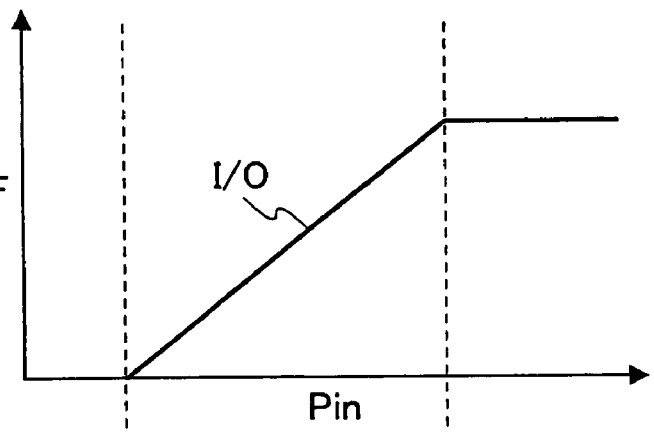
FIG. 4A and FIG. 4B show input/output characteristics of the optical signal processing device 20 and gain characteristics of the SGD 26 and SGD 30.
Figure 4B:
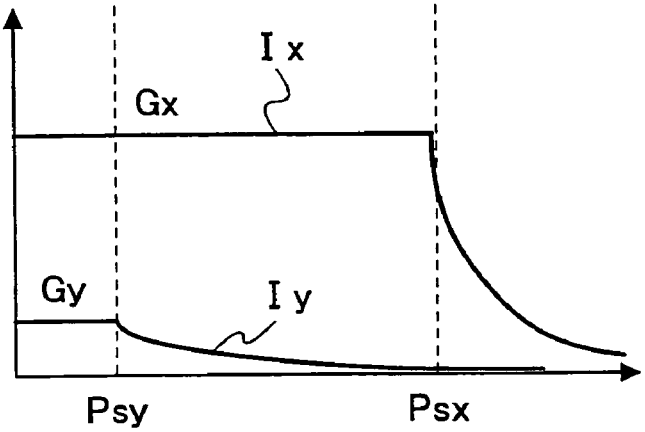

FIG. 4A and FIG. 4B show input/output characteristics of the optical signal processing device 20 and gain characteristics of the SGD 26 and SGD 30.

As indicated by a solid line Ix in FIG. 4B, the SGD 26 has non-linear gain characteristics, specifically, when the power (Pin) of the X component of the input optical signal exceeds a value of Psx, the gain Gx of the SGD 26 saturates.

Returning to FIG. 3, the X component of the input optical signal amplified by the SGD 26 is reflected on a mirror 32, and is input to a polarization element 34.

On the other hand, as indicated by a solid line Iy in FIG. 4B, the SGD 30 also has non-linear gain characteristics, specifically, when the power (Pin) of the Y component of the input optical signal exceeds a value of Psy, the gain Gy of the SGD 30 saturates.

Returning to FIG. 3, the Y component of the input optical signal amplified by the SGD 30 passes through an attenuator 36 and is input to the polarization element 34.

The polarization element 34 combines the X component and the Y component. The output signal from the polarization element 34 is output to an optical fiber 39 through a polarization element 38.

Figure 5:
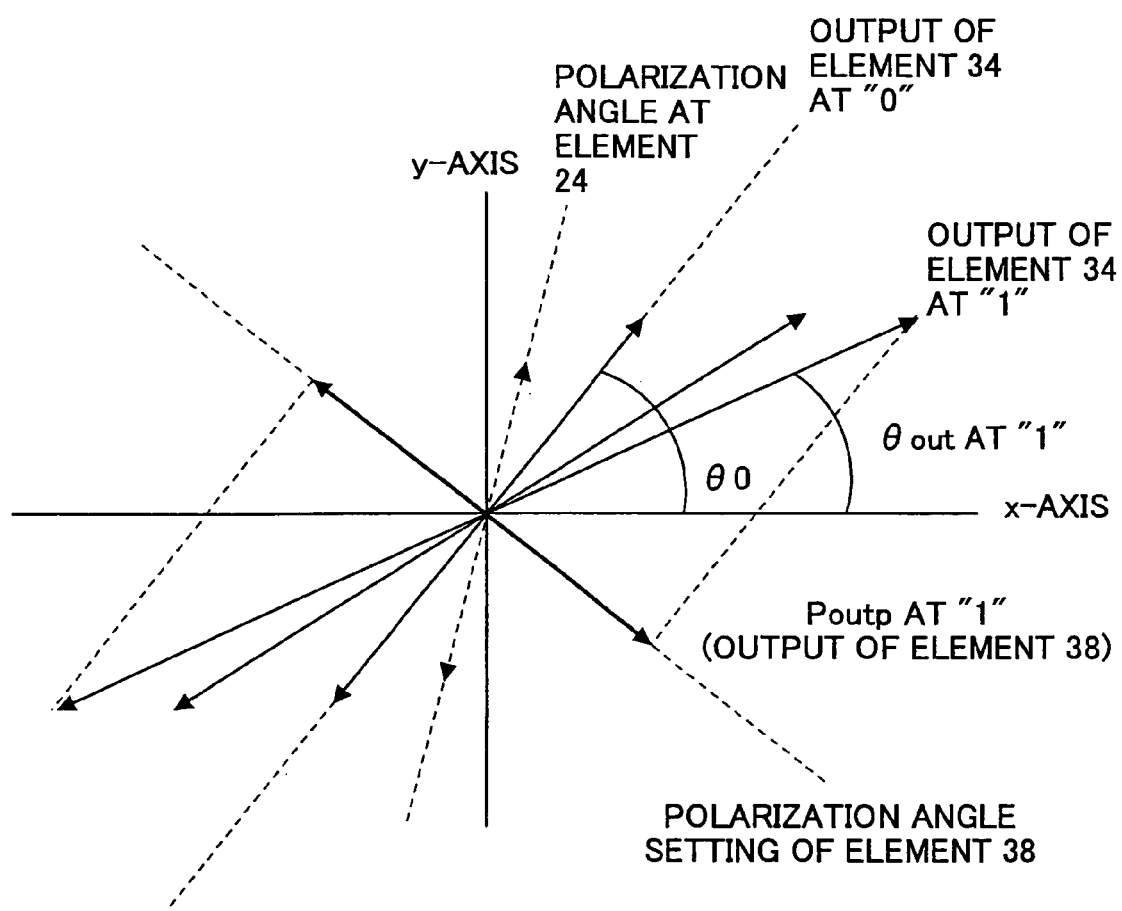
FIG. 5 is a vector diagram illustrating a principle of the optical signal processing device 20.

FIG. 5 is a vector diagram illustrating a principle of the optical signal processing device 20.

As illustrated in FIG. 5, an input optical signal having a polarization direction inclined relative to the X axis and the Y axis is input to the optical signal processing device 20. Because of dependence of gain on a polarization state, the polarization state changes after the optical signal transmits through the optical signal processing device 20. If an upper limit of the gain of light polarized along the X axis is different from an upper limit of the gain of light polarized along the Y axis, the polarization state of the combination of the output light from the SGD 26 and the SGD 30 changes depending on the power of the light input to the SGD 26 and the SGD 30.

The optical signal combined in the polarization element 34 enters into the polarization element 38. The polarization element 38 is arranged such that the polarization element 38 blocks the output polarized light from the polarization element 34 when the optical signal input to the optical signal processing device 20 is at a "0" level, that is, the output polarized light from the polarization element 34 is orthogonal to the polarization state of the polarization element 38. By such an arrangement, it is possible to reduce noise in the "0" level. In addition, by setting noise in a "1" level to be near an upper limit of the gain, it is possible to reduce noise in the "1" level. Hence, noise in both "0" level and "1" level can be reduced, and the S/N ratio of the optical signal can be improved. Returning to FIG. 4A, a solid line I/O indicates the input-output characteristics of the optical signal processing device 20.

Below, gain characteristics of the SGD 26 and SGD 30 are explained in detail.

First, assume the SGD 26 and SGD 30 are formed from semiconductor optical amplifiers (SOA) having gain saturation characteristics. The X axis is defined to be the direction parallel to a width direction of the active layer of the semiconductor optical amplifier, and the Y axis is defined to be the direction perpendicular to the X axis (the direction perpendicular to a plane of the active layer.

Light having an electrical component parallel to the X axis is incident on the semiconductor optical amplifier acting as the SGD 26, and light having an electrical component parallel to the Y axis is incident on the semiconductor optical amplifier acting as the SGD 30.

The linearly-polarized optical signal from the optical fiber 22 is indicated by Pin, and the polarization element 24 divides the input optical signal Pin into an X electric field component and a Y electric field component. The X component and the Y component are represented by Pinx and Piny, respectively. Pin, Pinx, and Piny satisfy the following relations:

$$Pin = (Pinx^2 + Piny^2)^{1/2}, \text{ and } 1 \ll Piny/Pinx.$$

Because the SGD 26 and SGD 30 are semiconductor optical amplifiers independent from each other, gains of the X component and the Y component can be set separately. The gains of the X component and the Y component are represented by Gx and Gy, respectively, and satisfy the following relations (1) and (2).

$$Gx = a \text{(when Pinx<Psx)},$$

$$Gx = a*Psx/Pinx \text{ (when Pinx>Psx)} \quad (1)$$

$$Gy = b \text{(when Piny<Psy)},$$

$$Gy = b*Psy/Piny \text{ (when Piny>Psy)} \quad (2)$$

where Psx indicates a saturation input level of the X component, Psy indicates a saturation input level of the Y component, a is a constant indicating an unsaturated gain in the X direction, and b is a constant indicating an unsaturated gain in the Y direction.

The X component of the output light of the SGD 26, which is indicated by Poutx, and the Y component of the output light of the SGD 30, which is indicated by Pouty, are expressed by the following equations (3) and (4), respectively.

$$Poutx = Gx*Pinx \quad (3)$$

$$Pouty = Gy*Piny \quad (4)$$

The polarization angle ($\theta$out) of the output light from the polarization element 34 is expressed by the following equation (5).

$$\theta out = \tan^{-1}(Pouty/Poutx) \quad (5)$$

Here, components of the input optical signal are respectively input to the SGD 26 and the SGD 30 by setting Pinx<Piny. Because Gx and Gy can be set independently, if the Y component is set to reach gain saturation at relatively low input power, the value of θout can be expressed by the following equations (6a), (6b), and (6c).

$$\theta out = \tan^{-1}[(b/a)*(Pouty/Poutx)] \quad (6a)$$

(both Pinx and Piny are unsaturated, and θout is constant.)

$$\theta out = \tan^{-1}[(b/a)*(Psy/Pinx)] \quad (6b)$$

(Pinx is unsaturated, and θout decreases along with increase of Pinx.)

$$\theta out = \tan^{-1}[(b/a)*(Psy/Psx)] \quad (6c)$$

(both Pinx and Piny are saturated, and θout is constant.)

Here, Piny/Pinx is set to be a constant sufficiently greater than 1.

The polarization element 38 is arranged at the output end of the polarization element 34, and is set so as to allow transmission of light having a polarization angle perpendicular to the polarization angle (θout=θ₀) of the light output from the polarization element 34 when both Pinx and Piny are unsaturated.

The output of the light transmitting the polarization element 38 Poutp is expressed by the following equation (7).

$$Poutp = [(Poutx)^2 + (Pouty)^2]]^{1/2} * \cos(\pi/2 - \theta_0 + \theta out) \quad (7)$$

where, $\theta_0$ is the value of θout when both Pinx and Piny are unsaturated.

The equation (7) can be reduced to be the following equations (8a), (8b), and (8c).

$$Poutp = 0 \quad (8a)$$

(both Pinx and Piny are unsaturated, $\cos(\pi/2)=0$)

$$Poutp = [(Poutx)^2 + (Psy)^2]]^{1/2} * \cos\{\pi/2 - \theta_0 + \tan^{-1}[(b/a)*(Psy/Pinx)]\} \quad (8b)$$

(Pinx is unsaturated)

$$Poutp = [(Psx)^2 + (Psy)^2]]^{1/2} * \cos\{\pi/2 - \theta_0 + \tan^{-1}[(b/a)*(Psy/Psx)]\} \quad (8c)$$

(both Pinx and Piny are saturated)

In this way, it is possible to reduce noise in both "0" level and "1" level to an optical level.

Second Embodiment

Figure 6:
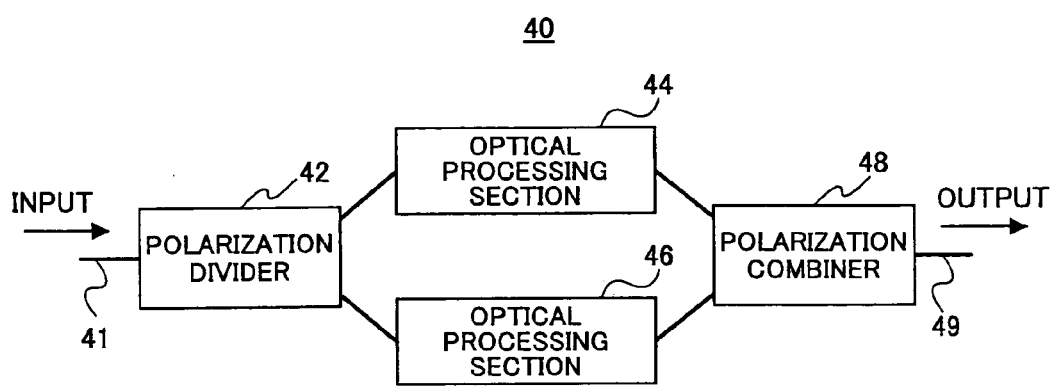
FIG. 6 is a block diagram illustrating an optical signal processing device 40 according to a second embodiment of the present invention.

FIG. 6 is a block diagram illustrating an optical signal processing device 40 according to a second embodiment of the present invention.

The optical signal processing device 20 in FIG. 3 suffers from polarization dependence in principle. The optical signal processing device 40 of the present embodiment is devised to solve this problem.

As illustrated in FIG. 6, in the optical signal processing device 40, a waveguide 41 supplies an input optical signal, the input optical signal is supplied to a polarization divider 42, and the polarization divider 42 divides the input optical signal into two linearly-polarized light components having polarization directions perpendicular to each other. The two linearly-polarized light beams are input to optical processing sections 44 and 46, respectively, with their polarization angles being appropriately set. The optical processing sections 44 and 46 have the same structure as the optical signal processing device 20 in FIG. 3.

The linearly-polarized light beams respectively output from the optical processing sections 44 and 46 are supplied to a polarization combiner 48 with the two linearly-polarized light beams being orthogonal to each other. The polarization combiner 48 combines the two linearly-polarized light beams, and the combined light beam is output through a waveguide 49.

The optical signal processing device 40 configured in this way is operable for input optical signals of most polarization states.

Third Embodiment

Figure 7:
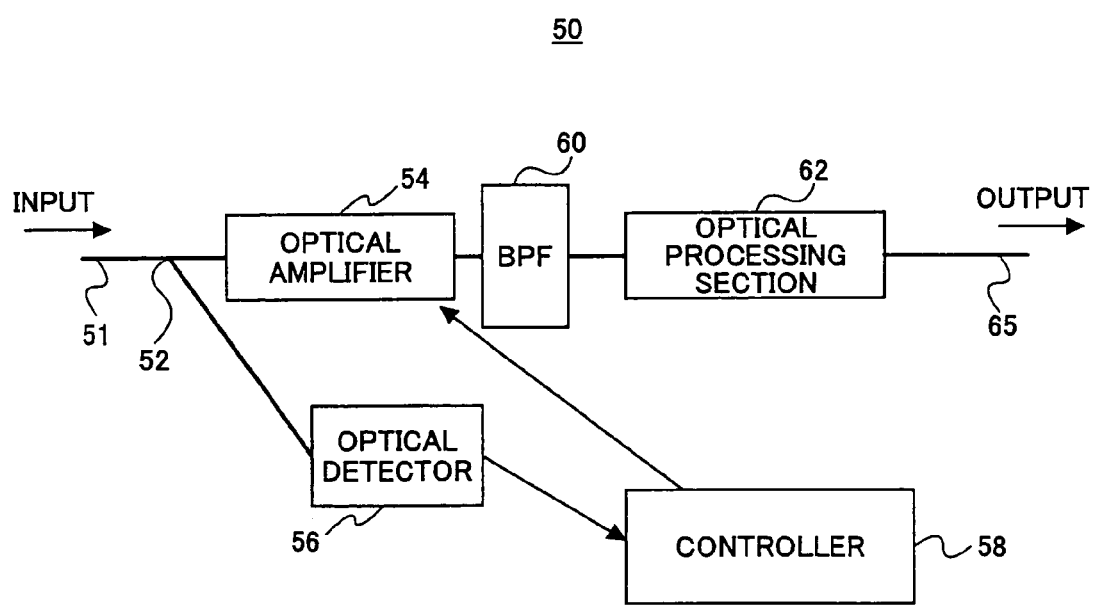
FIG. 7 is a block diagram illustrating an optical signal processing device 50 according to a third embodiment of the present invention.

FIG. 7 is a block diagram illustrating an optical signal processing device 50 according to a third embodiment of the present invention.

As illustrated in FIG. 7, a waveguide 51 supplies an input optical signal to the optical signal processing device 50. The input optical signal is divided into two optical signals at an optical coupler 52, and the two optical signals are supplied to an optical amplifier 54 and an optical detector 56, respectively.

The optical detector 56 detects an average value Pav of the power of the input optical signal, and sends the result to a controller 58. The controller 58 controls the gain of the optical amplifier 54 according to the average power Pav of the input optical signal.

When the average power Pav of the input optical signal is equal to a basic value Pset, the controller 58 sets the gain Gamp of the optical amplifier 54 to be a basic value Gset.

The power Posp of the optical signal supplied to an optical processing section 62 is expressed by the following equation, $$Posp = Pav * Gamp * T,$$

Where, T indicates a transmission rate between the optical amplifier 54 and the optical processing section 62.

If the upper limit of an optical signal input to the optical processing section 62 is represented by Ph, and the lower limit is represented by Pl, when Posp<Ph, the controller 58 sets the gain Gamp of the optical amplifier 54 in a region described by the following relation (9a).

$$Pl/(Pav*T) < Gamp < Ph/(Pav*T) \quad (9a)$$

When Posp>Ph, the controller 58 sets the gain Gamp of the optical amplifier 54 in a region described by the following relation (9b).

$$(Pav*T)/Ph < Gamp < (Pav*T)/Pl \quad (9b)$$

The optical signal amplified by the optical amplifier 54 is input to an optical band-pass-filter (BPF) 60, the optical band-pass-filter 60 removes an ASE (Amplified Spontaneous Emission) noise component generated in the optical amplifier 54, and the resulting optical signal is input to the optical processing section 62.

The optical processing section 62 has the same structure as the optical signal processing device 20 in FIG. 3 or the optical signal processing device 40 in FIG. 6. The optical signal from the optical processing section 62 is output through a waveguide 65.

It should be noted that the band-pass-filter 60 is not always required, but may be provided only when necessary.

The optical signal processing device 20 in FIG. 3 or the optical signal processing device 40 in FIG. 6 can effectively reduce noise in binary digital signals related to power of input optical signals in a specified region with the upper limit being Ph and the lower limit being Pl. Therefore, by controlling the power of the optical signal input to the optical processing section 62, it is possible to increase the range of the power of the input optical signal.

Fourth Embodiment

Figure 8:
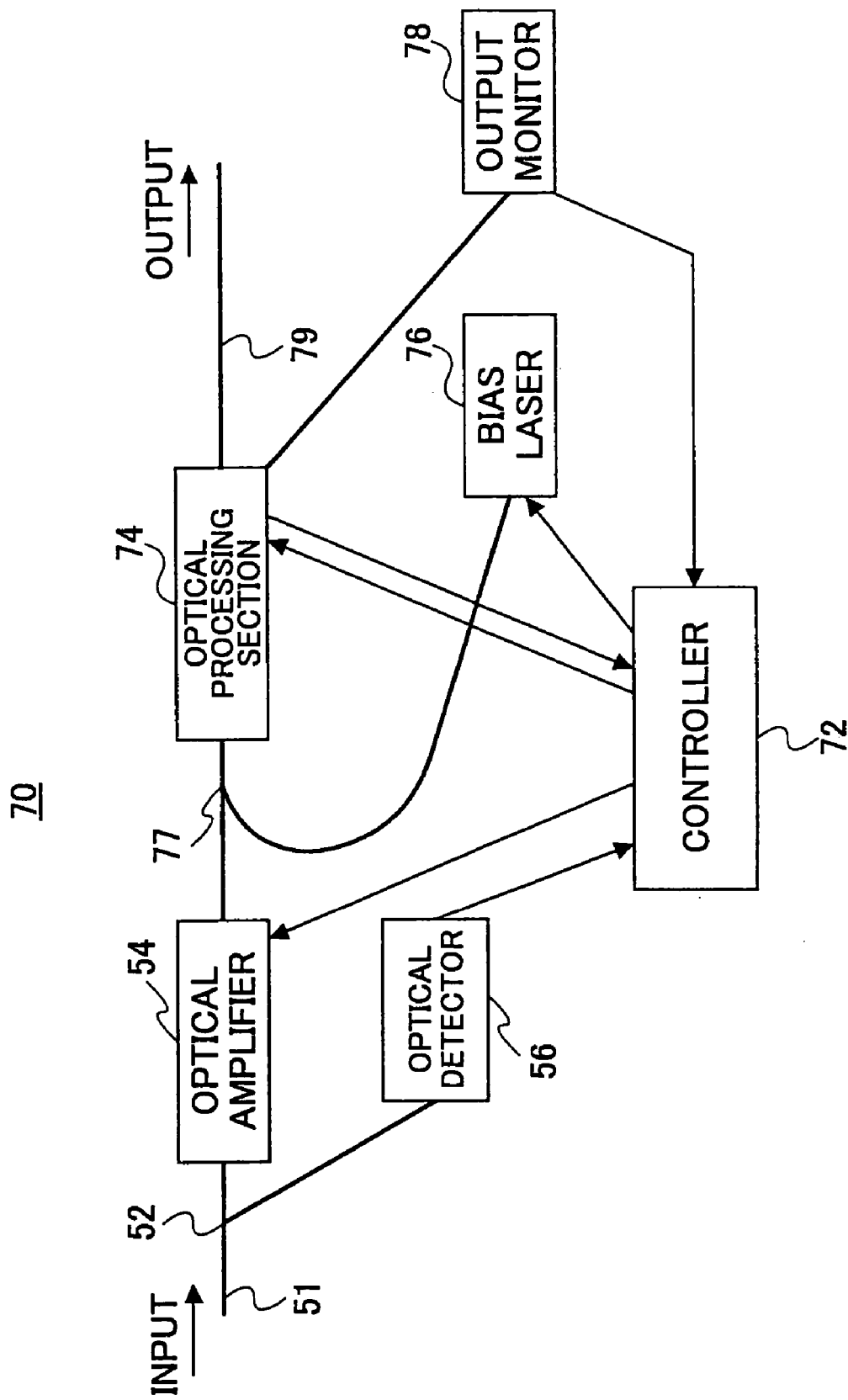
FIG. 8 is a block diagram illustrating an optical signal processing device 60 according to a fourth embodiment of the present invention.

FIG. 8 is a block diagram illustrating an optical signal processing device 70 according to a fourth embodiment of the present invention. In FIG. 8, the same reference numbers are assigned to the same elements as those in FIG. 7.

As illustrated in FIG. 8, a waveguide 51 supplies an input optical signal to the optical signal processing device 70. The input optical signal is divided into two optical signals at an optical coupler 52, and the two optical signals are supplied to an optical amplifier 54 and an optical detector 56, respectively.

The optical detector 56 detects an average value Pav of the power of the input optical signal, and sends the result to a controller 72. The controller 72, the same as the controller 58 in FIG. 7, controls the gain of the optical amplifier 54 according to the average power Pav of the input optical signal. This control operation is the same as that in the previous embodiment, and overlapping descriptions are omitted.

The optical signal amplified by the optical amplifier 54 is input to an optical processing section 74. The optical processing section 74 has substantially the same structure as the optical signal processing device 20 in FIG. 3 or the optical signal processing device 40 in FIG. 6, except that the optical processing section 74 further has a temperature control unit and a SGD degradation compensation unit (for example, a unit for driving current of each SGD) for temperature control and SGD degradation compensation under control of the controller 72.

A bias laser 76, while being controlled by the controller 72, emits a laser beam, the bias laser beam is combined with an optical signal output from the optical amplifier 54 at an optical coupler 77, and the resulting signal is input to the optical processing section 74. The power of output optical signals from each SGD in the optical processing section 74 is detected by an output monitor 78, and is sent to the controller 72. The optical signal from the optical processing section 74 is output through a waveguide 79.

The temperature control unit of the optical processing section 74 detects the temperature of each SGD, and the detected temperature is sent to the controller 72. The controller 72 controls the temperature control unit of the optical processing section 74 so that the temperature of each SGD is within ±5° C. relative to a preset temperature.

Degradation of a SGD is basically expressed by reduction of the gain. For this purpose, the controller 72 calculates the gain of each SGD (indicated by Gsgd(i)) from the detected value Pom of each SGD given by the output monitor 78, and the power of the optical signal input to the optical processing section 74 (indicated by Posp, and Posp=Pav*Gamp*T) by using the following equation (10).

$$G_{sgd}(i)=A(i)*Pom(i)/Pav*Gamp*T \qquad (10)$$

where, the index i indicates the number of the SGDs.

The controller 72 controls the driving current Id(i) of each SGD in the optical processing section 74 so that $G_{sgd}(i)$ is close to preset gains of each SGD, indicated by $G_{sgd-set}(i)$.

Specifically, when $G_{sgd}(i)<G_{sgd-set}(i)$, the controller 72 increases Id(i), and when $G_{sgd}(i)>G_{sgd-set}(i)$ the controller 72 maintains the Id(i) to be unchanged.

Basically, the bias laser has two effects. First, the bias laser biases the optical input to the SGDs so that saturation occurs easily even when the power of the input light is low. Second, although the input light consumes carriers inside the SGDs to acquire gains, the driving current Id(i) and the bias laser induce regeneration of the consumed carriers, namely, the bias laser helps improve response speed of the SGDs.

For this reason, if the control operation for maintaining $G_{sgd}(i)$ of each SGD to be constant by control of the driving current Id(i) is not sufficient, the power of the bias laser (denoted as Pbias) is controlled. Specifically, when $G_{sgd}(i)$ <$G_{sgd-set}(i)$, Pbias is increased, and when $G_{sgd}(i)>G_{sgd-set}(i)$, Pbias is maintained to be unchanged so as not to influence the response speed.

Fifth Embodiment

Figure 9:
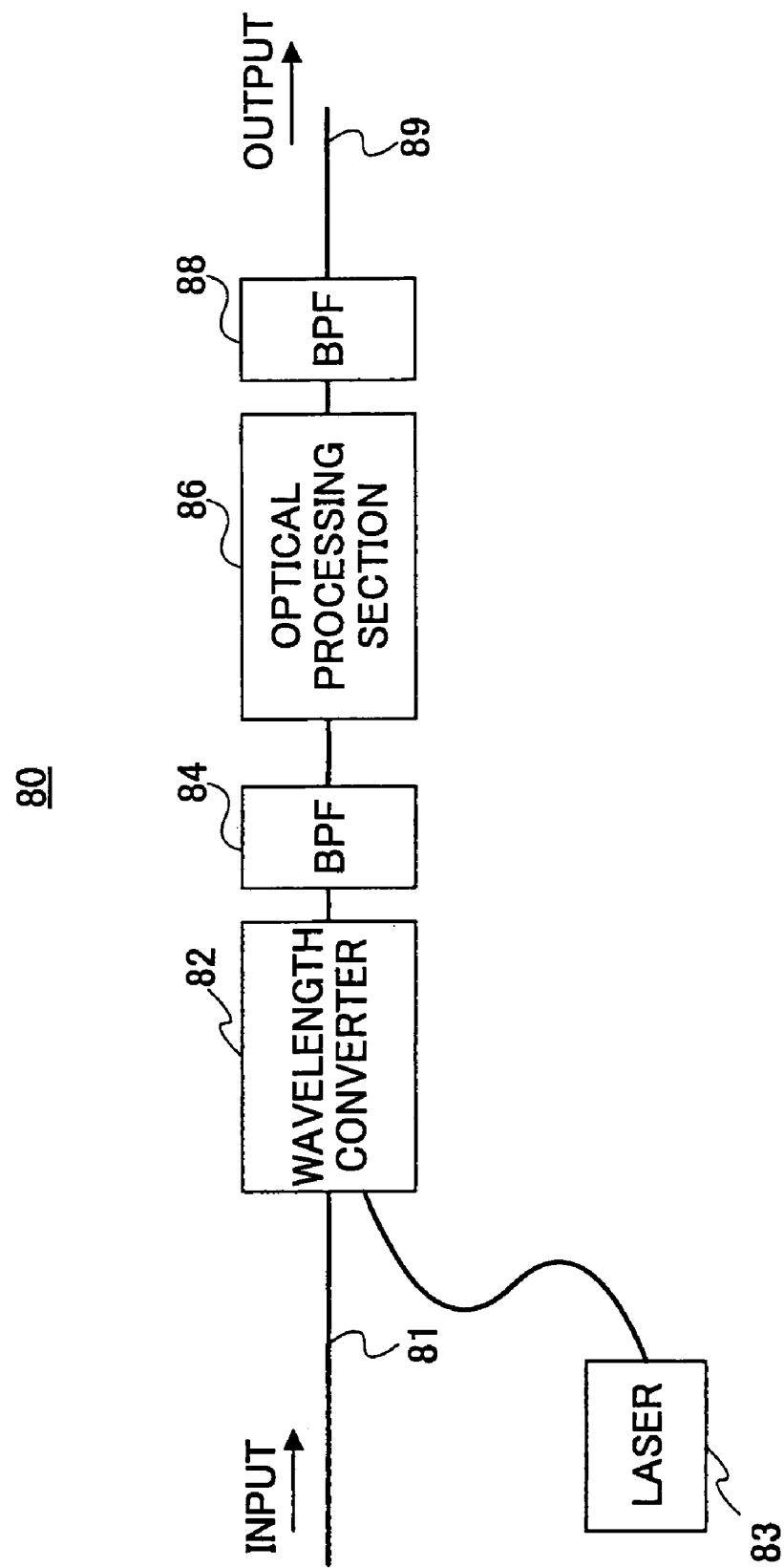
FIG. 9 is a block diagram illustrating an optical signal processing device 80 according to a fifth embodiment of the present invention.

FIG. 9 is a block diagram illustrating an optical signal processing device 80 according to a fifth embodiment of the present invention.

As illustrated in FIG. 9, a waveguide 81 supplies an input optical signal to a wavelength converter 82 of the optical signal processing device 80. For example, the wavelength converter 82 is a cross-phase modulation wavelength converter which employs a change of refractive index induced by a change of electron density in a gain saturation region of a semiconductor optical amplifier and has small polarization dependence. A laser 83 supplies a continuum laser beam to the wavelength converter 82. The wavelength of the continuum laser beam is the conversion destination wavelength of the wavelength converter 82.

Hence, an intensity-modulated signal of the input optical signal is obtainable from the wavelength converter 82, which is at the wavelength of the continuum laser beam and is converted to a predetermined polarization state. The thus obtained optical signal is input to an optical band-pass-filter (BPF) 84, the optical band-pass-filter 84 removes the input optical signal component, and transmits the resulting optical signal to the optical processing section 86.

The optical processing section 86 has the same structure as the optical signal processing device 20 in FIG. 3 or the optical signal processing device 40 in FIG. 6. The optical signal from the optical processing section 86 is input to an optical band-pass-filter (BPF) 88, the optical band-pass-filter 88 removes an ASE (Amplified Spontaneous Emission) noise component, and the resulting optical signal is output through a waveguide 89.

Due to the dependence on the polarization state of the input optical signal in the previously described optical signal processing devices 20 and 40, possibly, the optical signal processing devices 20 and 40 cannot adequately suppress noise. In contrast, in the optical signal processing device 80 of the present embodiment, the dependence on the polarization state is removed, and noise can be adequately suppressed.

Sixth Embodiment

Figure 10:
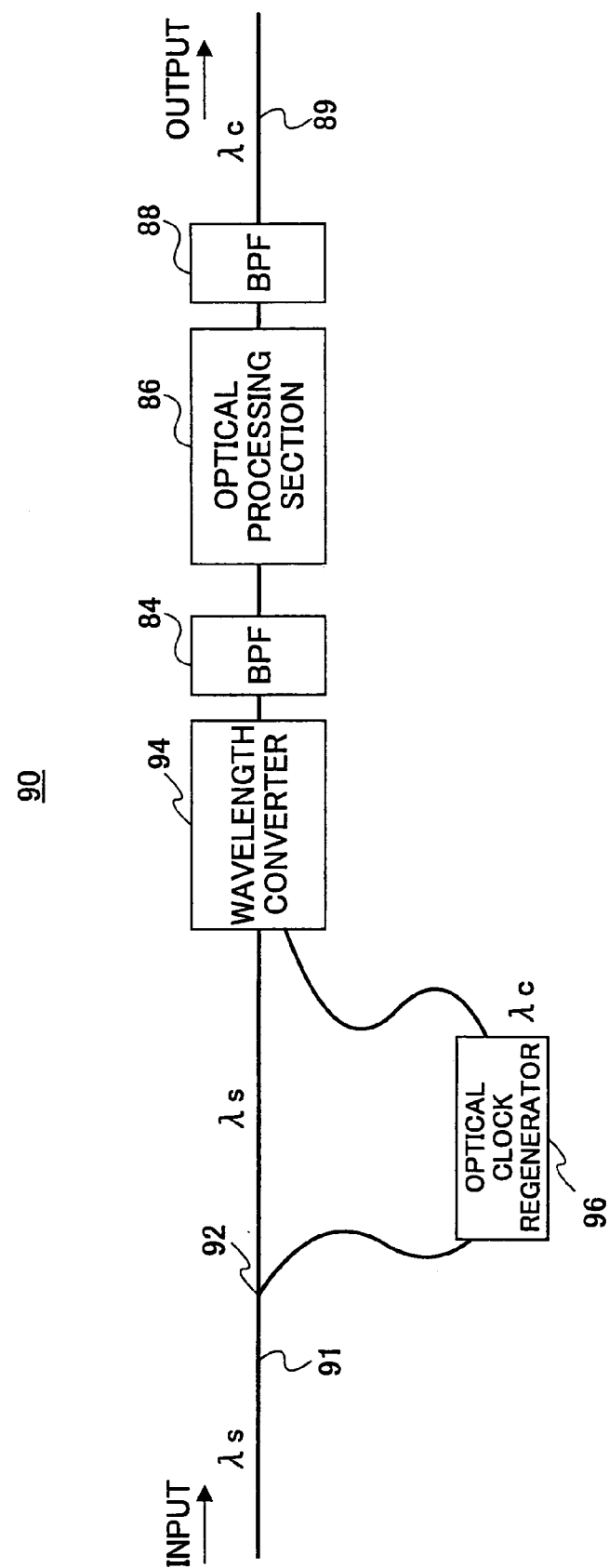
FIG. 10 is a block diagram illustrating an optical signal processing device 90 according to a sixth embodiment of the present invention.

FIG. 10 is a block diagram illustrating an optical signal processing device 90 according to a sixth embodiment of the present invention. In FIG. 10, the same reference numbers are assigned to the same elements as those in FIG. 9.

As illustrated in FIG. 10, a waveguide 91 supplies an input optical signal to the optical signal processing device 90. The input optical signal is divided into two optical signals at an optical coupler 92, and the two optical signals are supplied to a wavelength converter 94 and an optical clock regenerator 96, respectively.

The optical clock generator 96 generates an optical clock signal, which is a continuum light beam having a wavelength of λc, from the input light having a wavelength of λs.

For example, the wavelength converter 94 is a cross-phase modulation wavelength converter which employs a change of refractive index induced by a change of electron density in a gain saturation region of a semiconductor optical amplifier and has small polarization dependence. The optical clock regenerator 96 supplies the optical clock signal having a wavelength of λc to the wavelength converter 94 as bias light.

The wavelength converter 94 performs cross-phase modulation on the input optical signal and the optical clock signal with the optical clock signal as bias light. The wavelength converter 94 adjusts the level of the input optical signal and the driving current of a built-in semiconductor optical amplifier so that the wavelength converter 94 performs the conversion efficiently only in a time interval when the optical clock pulses overlap with the optical signal pulses. Hence, by reproducing timing information of the optical input signal, an optical signal free from jitter is obtainable.

The optical signal output from the wavelength converter 94 is input to the optical band-pass-filter (BPF) 84, the optical band-pass-filter 84 removes the input optical signal component, and transmits the resulting optical signal to the optical processing section 86.

The optical processing section 86 has the same structure as the optical signal processing device 20 in FIG. 3 or the optical signal processing device 40 in FIG. 6. The optical signal from the optical processing section 86 is input to the optical band-pass-filter (BPF) 88, the optical band-pass-filter 88 removes an ASE (Amplified Spontaneous Emission) noise component, and the resulting optical signal is output through a waveguide 89.

Concerning the optical clock regenerator 96, for example, reference can be made to H. Kurita, et al., IEICE Trans. Electon., Vol. E81-C, No. 2, pp. 129 (1998).

Seventh Embodiment

The SGD 26 and SGD 30 illustrated in FIG. 3 may be a distributed feedback semiconductor laser diode (DFB-LD) having gain saturation characteristics, a semiconductor amplifier (SOA), or a Raman amplifier.

Concerning the DFB-LD, for example, reference can be made to Taketa et al., Proc. of the 1999 communications society conference of IEICE , B-10-61 (1999). Concerning the SOA, for example, reference can be made to K. Inoue, IEEE, Photo. Tech. Lett. Vol. 8, pp. 458 (1996).

Figure 11:
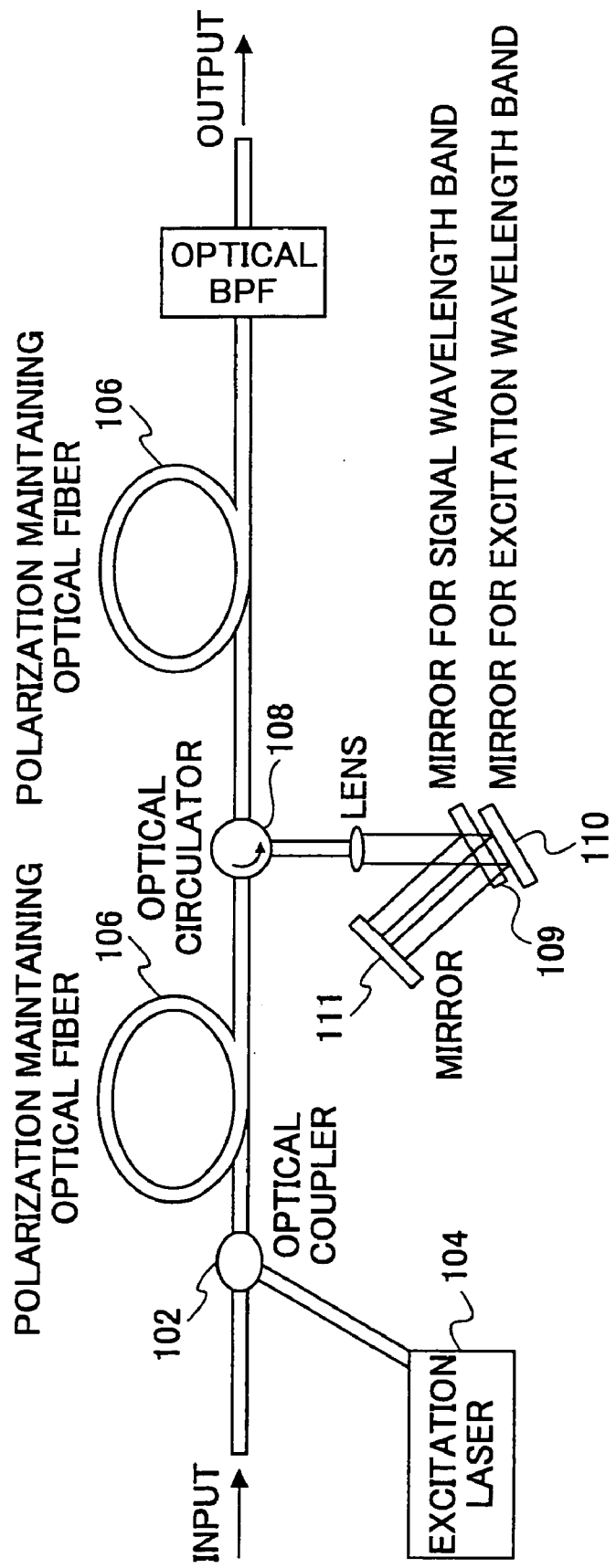
FIG. 11 is a block diagram illustrating a configuration of a SGD formed from a Raman amplifier.

FIG. 11 is a block diagram illustrating a configuration of a SGD formed from a Raman amplifier.

As illustrated in FIG. 11, an input optical signal and an excitation light beam propagating in the same direction as the input optical signal are input to a polarization maintaining optical fiber (PMF) 106 through an optical coupler 102. For example, the input optical signal is set to be in a polarization state parallel to one axis of the polarization maintaining optical fiber (PMF) 106. The Raman amplifier formed from the polarization maintaining optical fiber (PMF) 106 functions as a gain device maintained in a certain polarization state, and generally, the Raman amplifier is used as a SGD having gain saturation characteristics.

Because the length of the polarization maintaining optical fiber (PMF) 106 is of the order of, for example, a kilometer, walk-off may happen due to wavelength dispersion between the optical signal and the excitation light, and timing shift may arise in the gain saturation characteristics of each bit. In order to prevent this phenomenon, an optical circulator 108, a mirror 109 used in the signal wavelength band, a mirror 110 used in the excitation wavelength band, and a mirror 111 are provided between the two polarization maintaining optical fibers 106, and these elements form a compensation optical system which compensates for the timing shift between the optical signal and the excitation light. Due to this, the SGD in FIG. 11 is operable even at a high bit rate.

While the invention has been described with reference to preferred embodiments, the invention is not limited to these embodiments, but numerous modifications could be made thereto without departing from the basic concept and scope described in the claims.

In the above embodiments, because a SOA, a DFB-LD or another is used as the SGD, the power of the input optical signal inducing gain saturation can be set relatively freely relative to device design; hence, it is possible to induce gain saturation at input power lower than 10 mW, and allow the device to operate with an improved extinction ratio. In contrast, in a device using a non-linear loop mirror (NOLM) as in the related art, usually, peak input power near 100 mW is required, and it is necessary to mount an optical fiber as long as a few hundreds meters to a few kilometers.

That is, the optical signal processing device of the present invention can be made to have small size and low power consumption compared to the NOLM device.

In addition, compared to a device using wavelength converter having different wavelengths at input and output ends, the optical signal processing device of the present invention allows input and output of optical signals having the same wavelength, and the optical signal to noise ratio can be improved. As a result, the optical signal processing device of the present invention can be used without being limited by network configurations, and has high usability.

Further, in the present invention, even in the case in which the output power corresponding to a "0" level (space) is not "0" in a single device having gain saturation characteristics used as a SGD, with gains of two unsaturated SGDs being adjusted to be equal to each other, by utilizing polarization properties, theoretically, it is possible to set the output power to be "0". In doing so, it is possible to effectively and greatly improve an extinction ratio regardless of the performance of the gain saturation device in use.

The invention claimed is:

1. An optical signal-to-noise ratio improving device comprising:
   one or more optical signal-to-noise ratio improving sections;
   a dividing device that divides an input optical signal into a first component and a second component orthogonal to the first component, the first component being supplied to one of the optical signal-to-noise ratio improving sections at a predetermined polarization angle, the second component being supplied to another one of the optical signal-to-noise ratio improving sections at a predetermined polarization angle;
   a combination device that combines output light from the one optical signal-to-noise ratio improving section and output light from the other one optical signal-to-noise ratio improving section;
   an optical clock regeneration unit that regenerates an optical clock from the input optical signal; and
   a wavelength conversion unit that is supplied with the input optical signal and the regenerated optical clock, and generates an output optical signal having a predetermined polarization state and including an intensity-modulated signal of the input optical signal at the wavelength of the regenerated optical clock, the optical signal output from the wavelength conversion unit being supplied to the one optical signal-to-noise ratio improving section and the other one optical signal-to-noise ratio improving section.

2. An optical signal-to-noise ratio improving device comprising:
   one or more optical signal-to-noise ratio improving sections;
   a dividing device that divides an input optical signal into a first component and a second component orthogonal to the first component, the first component being supplied to one of the optical signal-to-noise ratio improving sections at a predetermined polarization angle, the second component being supplied to another one of the optical signal-to-noise ratio improving sections at a predetermined polarization angle;

a combination device that combines output light from the one optical signal-to-noise ratio improving section and output light from the other one optical signal-to-noise ratio improving section;

a continuum light generating unit that outputs a continuum laser beam; and a wavelength conversion unit that is supplied with the input optical signal and the continuum laser beam, and generates an output optical signal having a predetermined polarization state and including an intensity-modulated signal of the input optical signal at the wavelength of the continuum laser beam, an optical signal output from the wavelength conversion unit being supplied to the one optical signal-to-noise ratio improving section and the other one optical signal-to-noise ratio improving section.

3. An optical signal-to-noise ratio improving device comprising:

one or more optical signal-to-noise ratio improving sections;

a dividing device that divides an input optical signal into a first component and a second component orthogonal to the first component, the first component being supplied to one of the optical signal-to-noise ratio improving sections at a predetermined polarization angle, the second component being supplied to another one of the optical signal-to-noise ratio improving sections at a predetermined polarization angle;

a combination device that combines output light from the one optical signal-to-noise ratio improving section and output light from the other one optical signal-to-noise ratio improving section;

an optical amplification unit that amplifies the input optical signal, an optical signal output from the optical amplification unit being supplied to the one optical signal processing section and the other one optical signal processing section;

an optical detection unit that detects power of the input optical signal; and a gain control unit that controls a gain of the optical amplification unit according to the power of the input optical signal detected by the optical detection unit.

4. The optical signal-to-noise ratio improving device of claim 3, further including:

a bias light source that outputs bias light to be combined with the optical signal output from the optical amplification unit, said combined light being supplied to the one optical signal-to-noise ratio improving section and the other one optical signal-to-noise ratio improving section.

5. The optical signal-to-noise ratio improving device of claim 3, further comprising:

a plurality of gain devices having different saturation characteristics;

a driving current control unit that calculates gains of the gain devices in the optical signal processing section from a power level of the optical signal output from the optical amplification unit and respective power levels of optical signals output from the gain devices, and controls driving currents of the respective gain devices so that the gains of the gain devices become predetermined values.

* * * * *